United States Patent [19]

Case

[11] 4,021,999
[45] May 10, 1977

[54] SICKLE ASSEMBLY
[75] Inventor: Cecil L. Case, Newton, Kans.
[73] Assignee: Hesston Corporation, Hesston, Kans.
[22] Filed: Sept. 18, 1975
[21] Appl. No.: 614,482
[52] U.S. Cl. ............................................... 56/298
[51] Int. Cl.² ...................................... A01D 55/02
[58] Field of Search ............................. 56/296–312

[56] References Cited
UNITED STATES PATENTS

| 31,854 | 3/1861 | Thayer | 56/298 |
|---|---|---|---|
| 379,881 | 3/1888 | Voss | 56/304 |
| 443,791 | 12/1890 | Palmer | 56/300 |
| 1,726,378 | 8/1929 | Barber | 56/310 |
| 3,715,845 | 2/1923 | Braunberger | 56/305 |

Primary Examiner—Russell R. Kinsey
Attorney, Agent, or Firm—Schmidt, Johnson, Hovey & Williams

[57] ABSTRACT

The backing bar of the sickle overlies the cutter sections and is confined during its reciprocation within an elevated channel defined at the front by the rear ends of the tangs on the sickle guards and at the rear by the front ends of hold-down clips extending along and immediately behind the backing bar. No portions of the clips extend up and over the sickle, eliminating areas for crop clogging. The front ends of the clips overlie the rearmost edges of the cutter sections to maintain the sickle down against shearing surfaces on the guards.

4 Claims, 4 Drawing Figures

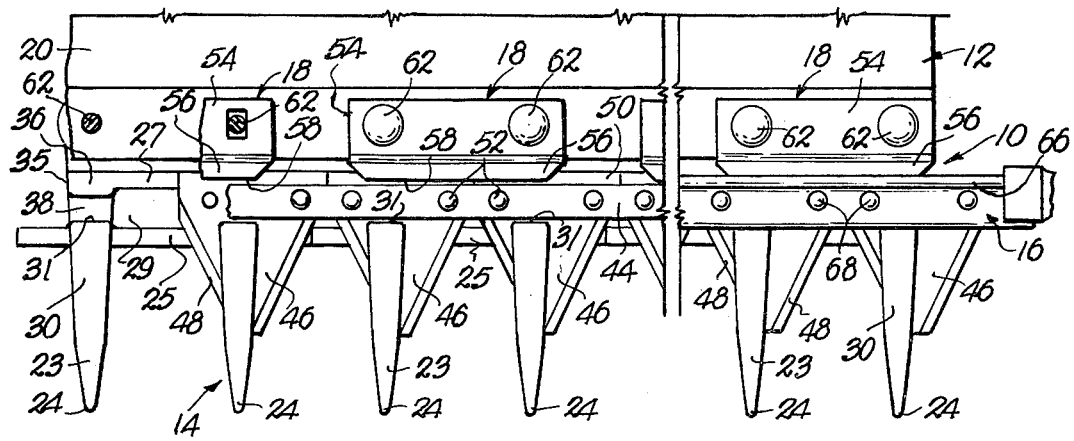
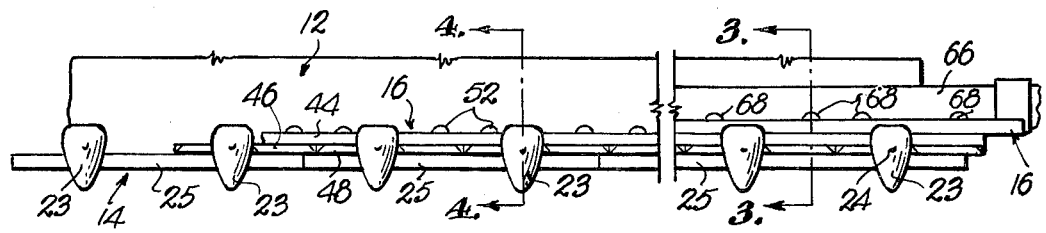
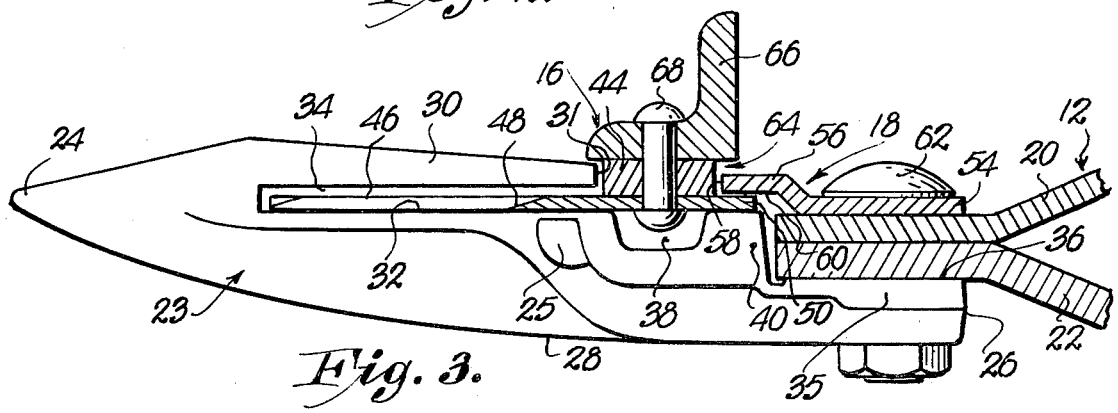
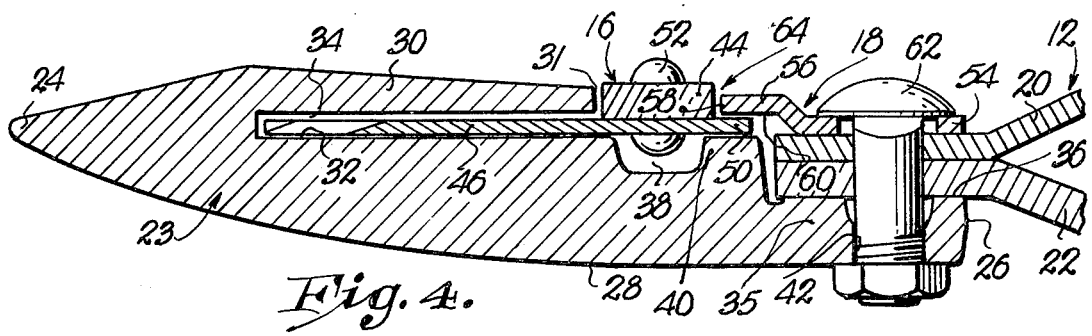

SICKLE ASSEMBLY

This invention relates to a sickle assembly such as is carried by a conventional reciprocating sickle mower or harvester. More specifically, this invention concerns a unique arrangement for mounting and controlling the sickle during its reciprocation through sickle guards of the assembly.

Sickle assemblies are well-known in the prior art, typically comprising a transversely reciprocating sickle carried upon a horizontal frame and provided with a plurality of rigid sickle guards. These assemblies are usually operated close to the ground for severing standing crop and thus must be able to withstand severe impacts with ground obstacles such a rocks and the like. Thus, the guards must be designed in such a way as to protect the cutter sections from breakage, and yet, unless such design is also planned with flow of the severed material in mind, the guards might cause the assembly to clog frequently, frustrating and aggravating the operator and causing loss of valuable time to shut down and clean out the assembly.

Most assemblies employ various forms of "hold-down clips" in conjunction with the guards which bolt to the cutter bar at the rear of the guards and extend forwardly therefrom above the sickle to contain the latter. However, by looping over the sickle in this way, the clips present open areas beneath their surfaces within which the material can become trapped.

One proposed arrangement for reducing the clogging potential of hold-down clips is illustrated in U.S. Pat. No. 3,715,845 to Braunberger where the clips are foreshortened so as to overlie only the rearmost part of the sickle. But, this sacrifices a degree of control over the sickle during its rapid reciprocation and, further, does not completely eliminate the presence of the clips over the top of the sickle.

Other sickle assemblies have utilized inverted sickles wherein the backing bar was located on top of rather than below the cutter sections in order to eliminate the need for a large transverse trough to clear and confine the bar during reciprocation, such troughs in themselves presenting sizable areas for collecting trash and other material. But the hold-down clips of these assemblies have been conducive to clogging because they have employed a high arch over the backing bar that restrains the latter at opposite ends of the arch against fore-and-aft displacement.

Thus, users of prior sickle assemblies have been universally faced with a trade-off dilema between sickle breakage and sickle clogging. Structure employed in prior devices to successfully prevent sickle breakage has heretofore been so arranged as to present areas susceptible to entrainment of severed crop and ground trash so as to cause clogging of the mechanism when operating in high moisture conditions. On the other hand, prior devices specially designed to prevent clogging have been vulnerable to sickle breakage, especially when operated in rocky areas.

Accordingly, one important object of the present invention is to provide a sickle assembly which minimizes sickle breakage without incorporating clog-conducive structure.

Pursuant to the foregoing, it is another important object of this invention to invert the sickle so its backing bar is on top of the cutter sections and to confine the bar between the rear ends of the guard tangs on the one hand and the front ends of the hold-down clips on the other hand, thus firmly controlling the sickle during reciprocation to reduce breakage and imparting a generally smooth, continuous top surface to the assembly that discourages, rather than invites, clogging.

A further important object of the invention is to have the front ends of the hold-down clips overlie the rearmost edges of the cutter sections to retain the same against upward displacement while at the same time having the clips positioned to limit rearward displacement of the backing bar as aforesaid.

An additional important object of this invention is to obtain the advantages of having the bottom rear support for the cutter sections integral with the guards themselves and having the top part or "tang" of each guard extended rearwardly over a large fore-and-aft length of the sections, all without interferring with rapid and trouble-free individual detachment of the guards from the cutter bar for replacement or repair.

In the drawing:

FIG. 1 is a partial plan view of a sickle assembly constructed in accordance with the present invention;

FIG. 2 is a partial front elevational view thereof;

FIG. 3 is an enlarged, cross-sectional view of the assembly taken along line 3—3 of FIG. 2; and FIG. 4 is an enlarged, cross-sectional view of the assembly taken along line 4—4 of FIG. 2.

In FIG. 1, a sickle assembly generally designated by the numeral 10 is shown in conjunction with an elongate support frame 12 which may be in the nature of a cutter bar. Assembly 10 comprises a plurality of elongate, generally cylindrically bluntnosed sickle guards 14, a sickle 16, and a plurality of hold-down clips 18.

Frame 12 is normally carried horizontally over the ground by a motive vehicle such that the longitudinal axis of frame 12 is disposed perpendicularly to the path of advancement of the vehicle. Frame 13 includes an elongate, apertured, upper support member 20 and a corresponding elongate, apertured, lower support member 22.

As will be described herinbelow, guards 14 are mounted to extend forwardly from frame 12 parallel to the vehicle's path of advancement. Each of the sickle guards 14 includes at least a pair of forwardly tapered fingers 23 having a nose 24 on one end, an opposed squared end 26, and a smooth, transversely arcuate, bottom surface 28 extending between the nose 24 and the end 26. The fingers 23 of each guard 14 are joined together by fore-and-aft spaced bridges 25 and 27 to define trash clearing openings 29 therebetween.

The top section of each finger 23 includes an elongate tang or lip portion 30 extending from nose 24 toward end 26 and overlying a horizontal sliding surface 32 in spaced relationship thereto, thereby defining an elongate fore-and-aft slot 34 which extends transversely through the finger 23 and is parallel to the axis thereof. The rear end of lip portion 30 remote from nose 24 presents a flat shoulder 31 facing away from nose 24 and disposed perpendicularly to the elongate axis of the finger 23.

A vertically narrow section 35 extends from end 26 toward nose 24 to approximately mid-length of each finger 23 respectively, and section 35 has an upwardly facing, horizontal mounting surface 36 immediately adjacent end 26 and opposite surface 28, a shallow transverse relief trough 38 just behind sliding surface 32, and an upstanding transverse rib 40 between trough 38 and surface 36. A mounting aperture 42 extends vertically through section 34 and intersects surfaces 28 and 36.

Sickle 16 has an elongate, rectangular backing bar 44 which overlies a linear series of flat, triangular cutter sections 46. Each section 46 has a pair of beveled, forwardly converging, cutting edges 48 and an opposed, rearmost marginal edge 50. The sickle sections 46 are each rigidly mounted on bar 44 by a pair of rivets 52 in such a manner that the cutting edges 48 converge outwardly from the bar 44 and marginal edge 50 is carried in parallel relationship to the longitudinal axis of bar 44. In the preferred embodiment, edges 50 extend slightly beyond the rear edge of bar 44.

Hold-down clips 18 each include a flat apertured portion 54 and an opposed, upwardly offset shoulder portion 56 which has a forwardmost linear edge 58 directly behind bar 44. Shoulder portion 56 also has a lower, downwardly facing retaining surface 60 which overlies the marginal edge 50 of the adjacent sections 46.

A pair of carriage bolts 62 extend through the apertures in each flat portion 54 and corresponding apertures in frame member 12 to rigidly mount clips 18 upon upper support member 20 such that the shoulder portions 56 extend forwardly therefrom and linear edges 58 are parallel to the elongate axis thereof. Each pair of bolts 62 also extends through the apertures 42 of a respective guard 14 to mount the latter against lower support 22 such that the noses 24 are carried forwardly of the longitudinal axis of frame 12. Front shoulders 31 are disposed parallel to edges 58 and spaced forwardly therefrom to present an open top channel 64 for bar 44 extending across the fingers 23. Lower surfaces 60 overlie respective ribs 40 in spaced, parallel relationship.

Sickle 16 is slidably carried in a horizontal position by guards 14 such that sections 46 rest upon surfaces 32 within slots 34 and bar 44 is disposed within channels 64. The rear marginal edges 50 of sections 46 ride between ribs 40 and retaining surfaces 60 of clips 18.

An elongate driving link 66 is rigidly connected to sickle 16 at one end thereof by a plurality of rivets 68. One end of link 66 extends beyond the sickle 16 and is adapted for connection with a mechanical oscillator (not shown) such as the conventional sway bar of a harvesting machine.

The operation of the present invention will be apparent from the above description. When link 66 is actuated by a mechanical oscillator, sickle 16 is caused to reciprocate relative to the frame 12 and rigidly carried guards 14. Beveled edges 48 cooperate with surface 32 to sever standing crops as the sickle assembly 10 is progressed across a field.

During reciprocation of sickle 16, bar 44 is well retained within channels 64 to prevent fore-and-aft movement of the sickle 16. Additionally, the sickle sections 46 are retained within slots 34 to prevent up-and-down movement of sickle 16 during its transverse reciprocation. Hold-down clips 18 prevent the rear portion of the sickle from rising, as well as restrict rearward movement of the sickle by virtue of edges 58 abutting bar 44.

The sickle assembly described herein not only provides maximum protection against sickle breakage, but also presents a clog-free mechanism which operates without jamming even in wet climates. Should an upward force be encountered by a cutter section 46 such as might be imparted by a large rock or the like, elongate lip portion 30 functions to hold that particular section downward in order to counteract the upward force and thereby prevent breakage of the section. Moreover, rearwardly directed forces encountered by the reciprocating sickle are absorbed by edges 58 contacting bar 44 to transmit the rearward forces to frame 12. The reaction force imparted to bar 44 by frame 12 through edges 58 will create a counterclockwise moment (viewing FIGS. 3 and 4) acting upon the sickle 16 that tends to force edges 48 downwardly against surfaces 32, thereby preventing clogging material from collecting between the sickle sections 46 and surfaces 32. This also assures that the proper shearing action is maintained between sections 46 and the edges of slots 34. And, because hold-down clips 18 terminate behind backing bar 44 rather than extending over and beyond the latter, they offer no impedance to the smooth rearward flow of severed crop material, thereby eliminating this potential source of clogging.

Note also that because backing bar 44 is disposed above rather than below sections 46, the troughs 38 need only be deep and wide enough to clear the heads of rivets 52 and 68. Thus, another potential collecting point for residue can be virtually eliminated.

If one of the guards 14 should become broken or otherwise in need of replacement or repair, the damaged part can be easily removed by simply releasing the appropriate pair of carriage bolts 62, lifting off the hold-down clip 18, and pulling the damaged guard forwardly from sickle 16. By virtue of backing bar 44 being above sections 46 rather than down in troughs 38, ribs 40 cannot interfere with forward removal of the guard, notwithstanding the fact that lip portion 30 extends rearwardly to the great extent that it does. Thus, in respects of breakage, clogging and maintenance, the assembly of the present invention is truly trouble free.

Having thus described the invention, what is claimed as new and desired to be secured by Letters Patent is:

1. In combination with an elongate mounting frame normally disposed in a horizontal position with its longitudinal axis transverse to its normal path of advancement, a sickle assembly comprising:

a plurality of horizontally slotted sickle guards longitudinally spaced along said frame and extending forwardly from the latter;

a sickle slidably carried by said guards and partially disposed within their slots for transverse reciprocation relative to said guards, said sickle including a plurality of flat, triangular cutter sections and a common bar supporting the sections in a series extending in parallel relationship to said frame, each of said sections having a pair of forwardly converging cutting edges; and structure cooperating with the guards for retaining said sickle in proper relationship with said guards during reciprocation, said bar being disposed on top of said section, said structure including a forwardly facing, rear shoulder directly behind and along the bar, and said guards having rearwardly facing, front shoulders directly ahead of and along the bar to present a transversely extending guide channel for the bar above the sections, said structure having all portions thereof disposed below the uppermost surface of said bar, each of said sections having a rearmost marginal edge which extends rearwardly beyond said bar, said marginal edges presenting an upwardly facing, horizontally disposed flat surface underlying said rear shoulder whereby the latter restrains said edges against upward movement.

2. The combination as claimed in claim 1, wherein said front and rear shoulders are discontinuous along the length of said frame, said rear shoulder having a plurality of aligned linear stretches spaced along the bar.

3. The combination as claimed in claim 1, wherein said structure comprises a plurality of generally flat holddown clips spaced along said frame, said clips having upwardly offset, forwardly extending portions cooperating to define said rear shoulder.

4. The combination as claimed in claim 3 wherein said upwardly offset portions of the clips overhang said upwardly facing flat surface.

* * * * *